(12) United States Patent
Farhan (10) Patent No.: US 6,667,994 B1
(45) Date of Patent: Dec. 23, 2003

(54) MULTIPLEXING DIGITAL COMMUNICATION SYSTEM

(75) Inventor: Forrest M. Farhan, Alpharetta, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 749 days.

(21) Appl. No.: 09/590,433

(22) Filed: Jun. 9, 2000

(51) Int. Cl.[7] .................................................. H04J 3/04
(52) U.S. Cl. ...................................... 370/535; 370/503
(58) Field of Search ................................ 370/532–542, 370/503

(56) References Cited

U.S. PATENT DOCUMENTS

| | | | | |
|---|---|---|---|---|
| 3,696,403 A | * | 10/1972 | DiRocco | 340/347 |
| 3,840,891 A | * | 10/1974 | Hellwarth | 340/174.1 |
| 4,061,577 A | | 12/1977 | Bell | 250/199 |
| 4,558,445 A | * | 12/1985 | Novick | 370/84 |
| 4,763,317 A | | 8/1988 | Lehman et al. | 370/58 |
| 4,888,768 A | | 12/1989 | Michener | 370/102 |
| 5,351,148 A | | 9/1994 | Maeda et al. | 359/124 |
| 5,544,161 A | | 8/1996 | Bigham et al. | 370/58.1 |
| 5,644,622 A | | 7/1997 | Russell et al. | 455/422 |
| 5,748,348 A | | 5/1998 | Heidemann et al. | 359/125 |
| 5,790,523 A | | 8/1998 | Ritchie, Jr. et al. | 370/241 |
| 5,790,533 A | | 8/1998 | Burke et al. | 370/318 |
| 5,878,325 A | | 3/1999 | Dail | 455/5.1 |
| 5,966,636 A | | 10/1999 | Corrigan et al. | 455/4.2 |
| 6,041,056 A | | 3/2000 | Bigham et al. | 370/395 |
| 6,161,011 A | | 12/2000 | Loveless | 455/426 |
| 6,323,793 B1 | * | 11/2001 | Howald et al. | 341/137 |
| 6,539,109 B1 | * | 3/2003 | Hirose | 382/162 |

FOREIGN PATENT DOCUMENTS

| | | |
|---|---|---|
| EP | 0 318 331 | 5/1989 |
| EP | 0359205 | 3/1990 |
| EP | 0512642 | 11/1992 |
| EP | 0767555 | 4/1997 |

OTHER PUBLICATIONS

XP–000806868, "Restructured DS3 Format for Synchronous Transmission (Syntran)," Ballart, R. et al., Bell Communications Research, Proceedings of the Global Telecommunications Conference and Exhibition (Globecom), New York, IEEE, US, vol. 2, 1984, pps. 1036–1042.

* cited by examiner

Primary Examiner—Wellington Chin
Assistant Examiner—Brenda Pham
(74) Attorney, Agent, or Firm—Kenneth M. Massaroni; Hubert J. Barnhardt, III; Shelley L. Couturier (57) ABSTRACT

A transmitter (501) for use in a communication system (500) includes clock input for receiving a clock signal and input ports (503, 510, 513) coupled to external signal sources for receiving input signals that are synchronously modulated at modulation frequencies rationally and fractionally related to the clock frequency and to each other. Additionally, the clock frequency should be greater than any of the modulation frequencies. An analog-to-digital converter (505) receives the analog input signals and converts them to a digital format, and a multiplexer (515) then processes the digital input signals and signals from the converter (505) to generate a single serial output signal. An output port of the transmitter (501) then transmits the single serial output signal as a digital signal having a bit rate equivalent to the number of input signals multiplied by the sampling frequency, plus additional overhead for optional framing and error correction.

12 Claims, 5 Drawing Sheets

MULTIPLEXING DIGITAL COMMUNICATION SYSTEM

FIELD OF THE INVENTION

This invention relates generally to broadband communication and telecommunication systems and, more specifically, to methods and systems for the transmission of multiple digital and/or analog input signals on a single high-speed electronic or optical channel.

BACKGROUND OF THE INVENTION

Modem broadband communication systems often use a single channel to transmit data that is generated by several input sources. These systems may be used in a wide range of applications, including the transport of signals in a bidirectional cable television (CATV) plant and the high speed transfer of data in a network of computers and/or peripheral devices. Cable television systems, for example, use fiber optic cables excited by single-frequency laser transmitters to transfer information between the headend station and primary and/or secondary hubs. Fiber optic links are also used to connect each of the hubs to nodal stations (nodes) that distribute headend-generated information to individual subscribers in the form of radio frequency (RF) electronic signals. In many cases, the information transfer between the headend station and individual subscribers is bidirectional. Conventionally, wavelength division multiplexing may be used to minimize interference between the forward and reverse signals. Systems utilizing this technique assign different wavelength bands to forward and reverse communications in the radio-frequency (RF) portion of the network. Bidirectional optical links use laser transmitters operating at different wavelengths to eliminate crosstalk between counterpropagating signals.

In most cases, it is desirable to transfer several different types of information between the headend and nodes. In the forward and reverse directions, different information types will have different modulation formats (QAM, FSK, On/Off keying, etc.), with each type assigned to a specified frequency band in the transmitted signal. Practically, this is accomplished by mixing each input signal with an intermediate frequency (IF) carrier having various mixing frequencies and summing the resultant signals. The sum is then provided to the transmitter input port. At the receiver, bandpass filters may be used to separate the different signal types, each of which is provided to an individual receiver used to recover the input information.

In an improved digital transport architecture, optical links from the nodes to the headend utilize an on/off keying modulation scheme. In order to transmit different types of information, prior art transmitters must first determine the modulation format of the input data. Once identified, slices of the input bit streams are assembled into output data blocks. Different types of data are assigned to time slots that are delayed by a predetermined time interval with respect to the leading edge of a block. Hardware for accomplishing this task, however, is complicated and expensive.

Thus, what is needed is an improved, low cost method and system for transmitting dissimilar data types along a single broadband communication channel using various, and perhaps arbitrary, modulation formats.

DETAILED DESCRIPTION OF A PREFERRED EMBODIMENT

Figure 1:
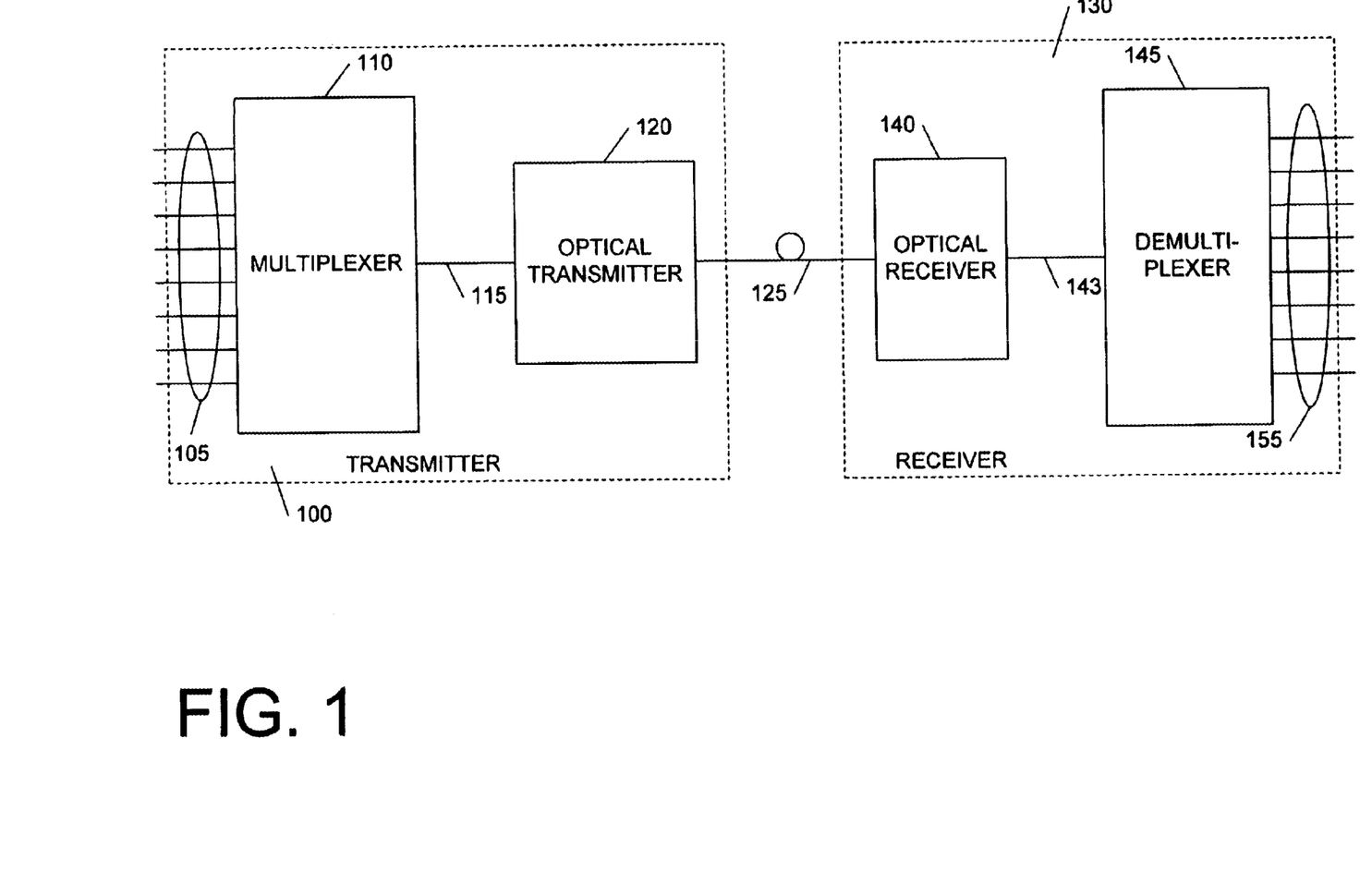
FIG. 1 is a block diagram of a prior art communication system for transporting data from several input lines using a single-mode optical fiber.

FIG. 1 shows system components that can be incorporated into a broadband or high speed communication system, such as a cable television (CATV) system. These components transport data from the set of input lines 105 of a transmitter 100 to the output lines 155 of a receiver 130 using a single-mode optical fiber 125. In the ideal case, the output signals identically replicate the input signals. In the general case, input data may be sent to the transmitter 100 using analog or digital modulation formats such as synchronous or asynchronous on/off digital keying, frequency shift keying (FSK), quadrature amplitude modulation (QAM), etc. The speed of data transfer and modulation format may be different for each input. Amplifiers external to the transmitter 100 may be used to adjust the input voltage states to a common range of values.

Inside the transmitter 100, a multiplexer 110 transfers the data from the multiple input lines 105 to a single high-speed serial output 115. This output drives an optical transmitter 120 that excites a single-mode optical fiber 125. At the receiver 130, an optical receiver 140 converts the transmitted lightwave signal to an on/off keyed electrical signal. A demultiplexer 145 decodes the receiver output and transfers the data from a single high-speed serial line 143 to a series of outputs 155 that match the inputs 105 in number and modulation format.

The modulation formats for the high-speed optical link are established in accordance with existing standards. For example, the data could be transmitted in blocks that are framed by a series of 'start' bits. Within a data block, different input data types could be assigned to specific time slots. The multiplexer 110 then analyzes the signals on each of the input lines to determine the modulation format and to temporally position slices of data at defined locations (corresponding to time intervals) within the data block. At the receiver 130, the demultiplexer 145 determines the modulation format for the data in a particular slot from its temporal displacement relative to the leading edge of the data block. Thus identified, the data in each packet is sent to the appropriate output line.

While data transfer using this approach is both accurate and efficient, complex and expensive hardware resources are required to correctly identify and position the different data types in the transmitted bit stream. The cost of, and space required for, such components are significant drawbacks to the utilization of prior art components in many applications.

This problem, however, can be effectively addressed through the use of an improved multiplexing technique in accordance with the present invention. Input data may be multiplexed by sampling and digitizing the input values and combining them into digital word in a transmission stage of a communication system. Blocks of digital words can then be transmitted to a receiving station, where a demultiplexer constructs a replica of the input signal from the digital values. Preferably, input modulation formats are restricted to bandlimited subcarrier analog modulation and digital baseband formats. It is also preferable that analog input frequencies are restricted to values less than one half of the sampling clock rate, while digital modulation rates are less than or equal to the sampling rate. In the case of synchronously modulated digital inputs, the rates of the sampling clock and individual inputs are related by rational fractions.

Figure 2:
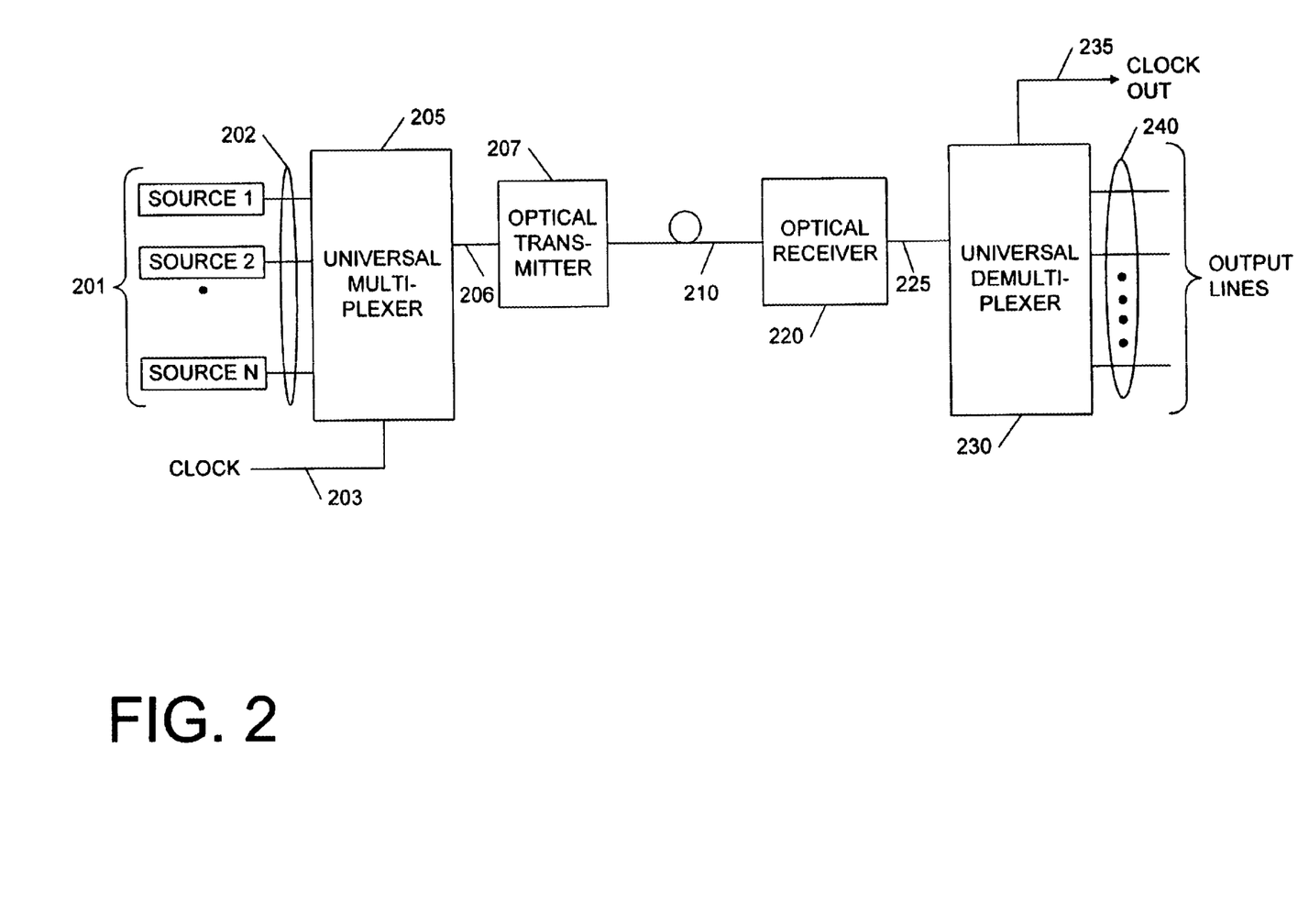
FIG. 2 is an electrical block diagram of a communication system incorporating a universal multiplexer/demultiplexer according to the present invention.

FIG. 2 is an electrical block diagram of an improved digital transmission system embodying the features of this invention. In this system, N synchronously-modulated digital data sources 201 with different data transmission rates are connected to the inputs 202 of a universal multiplexer 205. Each source 201 provides an output that is synchronously modulated at a frequency that is less than or equal to the frequency of a clock signal 203 that is provided as another input to the multiplexer 205. The modulation frequencies of the individual inputs are also rationally and fractionally related to the source clock frequency and to each other.

Mathematically stated, $$f_i = R \cdot f_s$$

where $f_s$ is the frequency of the multiplexer input clock, $f_i$ is the frequency of the $i^{th}$ input source (i=1,2,3..., n), and R is a number less than or equal to 1 and defined by M/N, where M and N are integers, and where M is less than or equal to N.

Assuming the data and clock inputs meet these broad conditions, the bit rates of the inputs are unimportant. Since all inputs are processed in the same way, the complicated and expensive hardware required to identify the input modulation format in prior art communication products is eliminated.

The bit rate of the universal multiplexer serial output line 206 is equal to the number of input lines, N, multiplied by the sampling frequency, $f_s$, plus the additional overhead required for framing and error correction. The multiplexer output drives a laser transmitter 207 in a conventional fashion, and the resulting lightwave signal is transported to the optical receiver 220 using single mode optical fiber 210.

At the receiver 220, the lightwave signal is converted to a conventional digital electronic signal.

A universal demultiplexer 230 then decodes the high speed serial output 225 of the receiver 220 to produce digital bit streams on N output lines 240, each having the same modulation format as its corresponding input 202 to the multiplexer 205. Additionally, an image of the multiplexer clock input 203 is provided on the 'clock out' line 235.

The system of FIG. 2 may also be used to transport asynchronous digital and/or bandlimited subcarrier modulated analog inputs, regardless of their contents. In these cases, the sampling clock rate must be higher than the input modulation rate for accurate transmission. In other words, the clock frequency must be greater than the frequency of the modulated input signal.

Preferably, analog inputs should be sampled at a rate that is at least two times greater than the channel bandwidth, and asynchronous digital inputs should be oversampled at a rate greater than the incoming data transmission rate. Assuming these conditions are met, the multiplexer 205 can handle a wide range of inputs with dissimilar modulation formats. In this sense it may be referred to as 'universal' since it can accept almost any type of input. Since all inputs are processed in the same way, the complicated and expensive hardware required to identify the input modulation format in prior art communication products is eliminated.

In accordance with the present invention, the multiplexer 205 can, for instance, temporally position slices of data at locations that are predetermined based upon input port. For example, all data originating from a first source can be positioned at known locations, using conventional framing, coding, and interleaving techniques. Alternatively, other techniques could be used to identify the source of transmitted information for subsequent reconstruction on the receiving end of the system.

Figure 3:
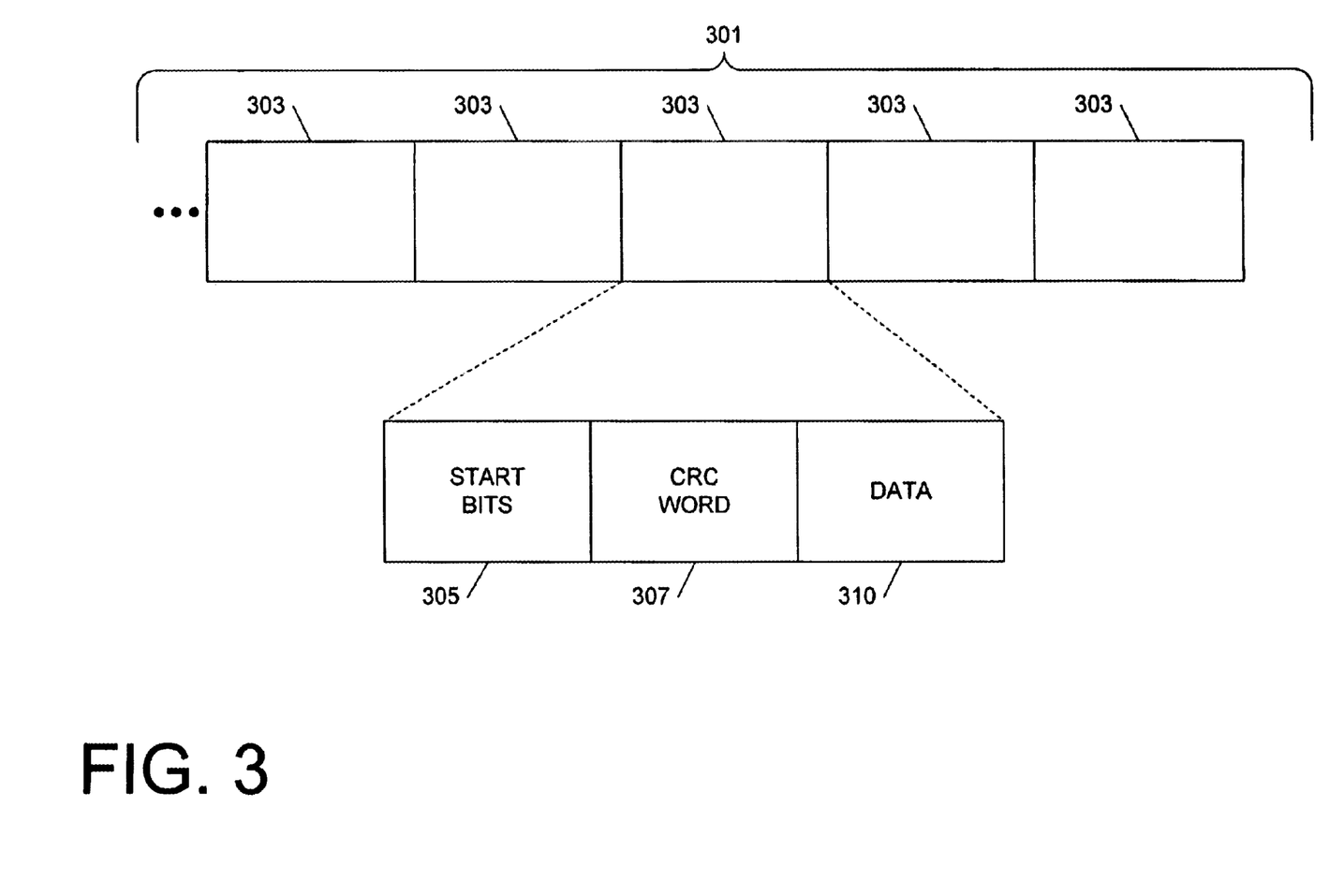
FIG. 3 is a diagram detailing the data fields in the output bit stream of a universal multiplexer in accordance with the present invention.

FIG. 3 is a signal diagram of an example signal provided at the universal multiplexer output 206 (FIG. 2). The on/off modulated data stream 301 can include a series of data blocks 303 with common data fields. Within each block 303, the first data field 305 can contain a set of 'start' bits, while the second field 307 can contain, for instance, a four-bit or five-bit word that is used for cyclic redundancy checking. The third field 310 can include data that may optionally be scrambled using prior art techniques to achieve a balanced density of 1's and 0's.

In operation, the universal multiplexer 205 typically samples the digital input lines on the rising edge of each sampling clock pulse. Assuming N input lines, an N-bit word is generated at each clock pulse. These words are stacked in a buffer memory (not shown) that may, for example, have a depth of twenty (20) words. When the buffer is filled, its contents are output as a serial bit stream at a data rate greater than N times the sampling clock frequency. A 'wrapper' containing start bits and a cyclic redundancy check word are added to the beginning of the data stream in a conventional manner, thereby generating a data block such as that shown in FIG. 3.

Figure 4:
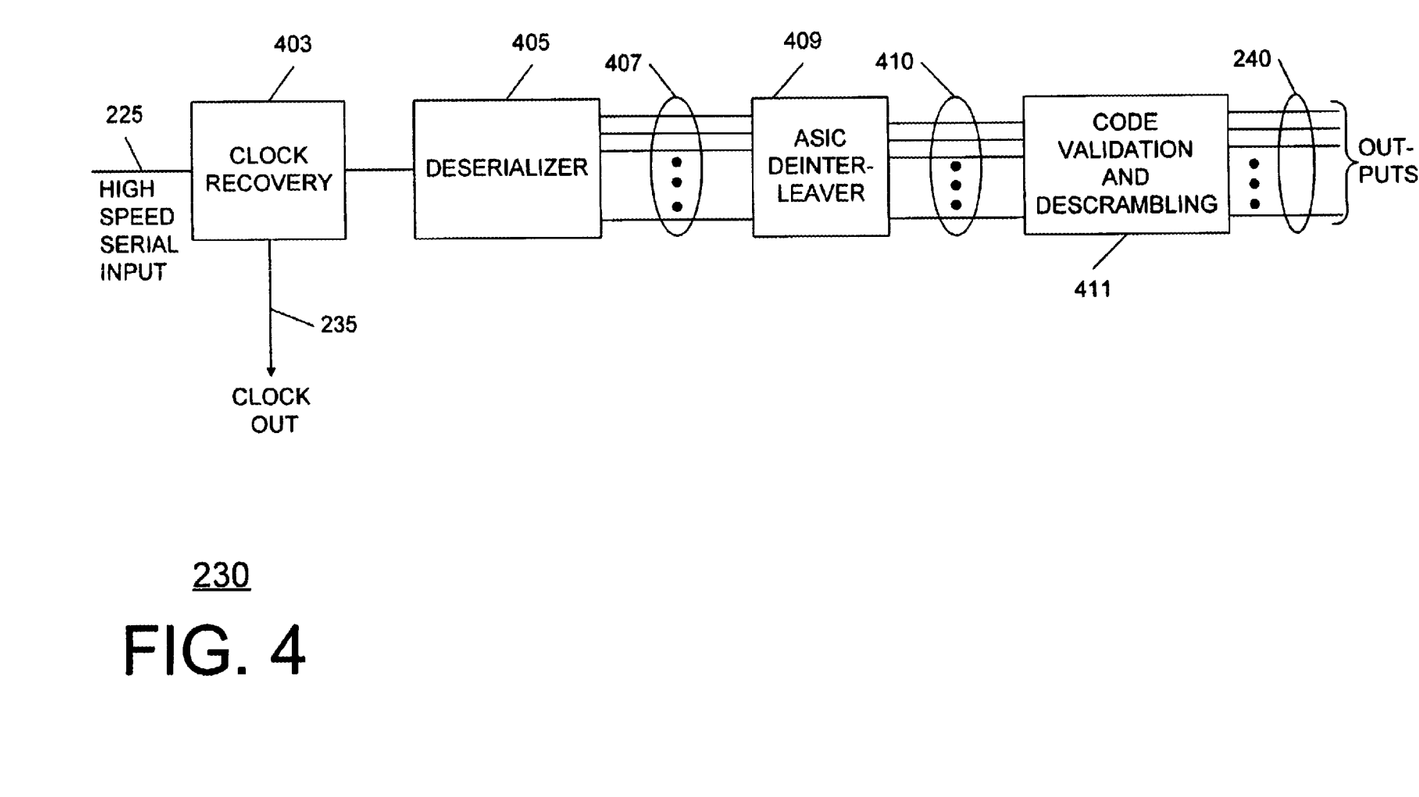
FIG. 4 is a block diagram of a universal demultiplexer in accordance with the present invention.

FIG. 4 is a schematic representation of components of the universal demultiplexer 230 in the communication system of FIG. 2. In this unit, a clock recovery circuit 403 determines the bit rate of the input signal 225 and clocks out any 'zero' data using techniques that are well-known in the prior art. A 'clock out' signal 235 that reproduces the transmitter input sampling clock is also generated. The modified serial bit stream is deserialized using a deserializer 405 that operates in a conventional manner, and the resulting data is output on an N-bit bus 407, where N is equal to the word length of the transmitted data (i.e., the number of transmitter input lines).

The output of the deserializer 405 is analyzed by a deinterleaver 409, such as an ASIC deinterleaver, that correctly aligns the data on its output bus 410. The deinterleaver output is checked for code violations in a conventional fashion by the data recovery circuit 411. If the transmitted data has been scrambled, or encoded, by the transmitter 207 (FIG. 2) to balance the distribution of 1's and 0's, this circuit 411 then descrambles the data using conventional techniques. Data streams on the output lines 240 of the data recovery circuit 411 are time-delayed reproductions of the transmitter inputs.

Figure 5:
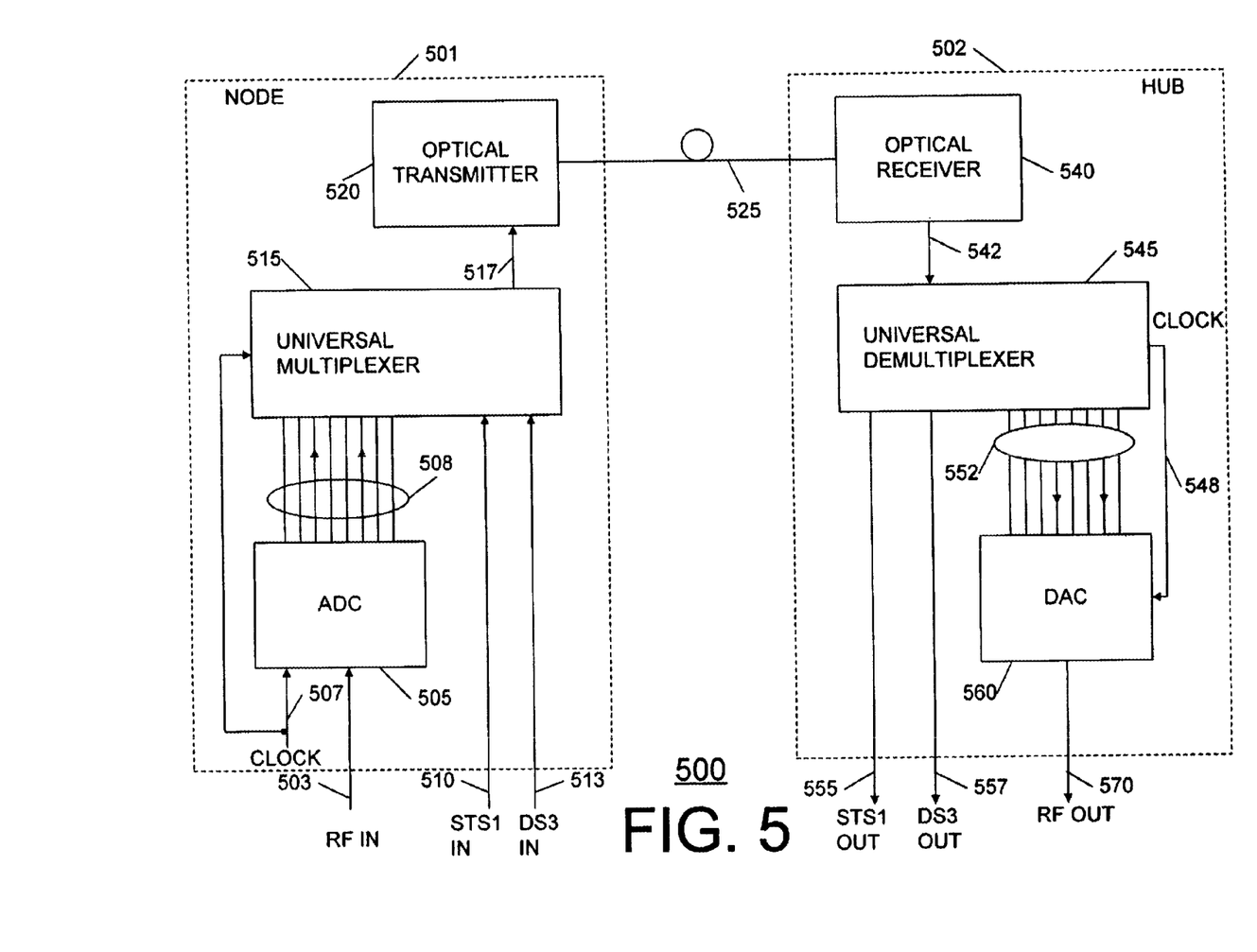
FIG. 5 is a block diagram of an optical communication link within a broadband communication network including a universal multiplexer/demultiplexer in accordance with the present invention.

FIG. 5 is a block schematic diagram of a reverse communications link between a transmitting device, such as a node 501, and a receiving device, such as a hub 502, in a broadband communication system 500 utilizing a digital reverse architecture in accordance with the present invention. In the broadband access system 500, inputs with modulation formats such as DS3, STS 1 and analog RF are transported upstream (or in the reverse direction) from node 501 to the hub 502 using a single optical fiber channel 525. At the node 501, an RF input signal 503 is digitized by an analog-to-digital converter (ADC) 505 at a rate determined by the clock input 507. The multiple-bit output bus 508 of the ADC 505 is connected to the universal multiplexer 515 along with input lines 510 and 513.

Signals received on the input lines 510 and 513 are preferably modulated according to the STS and DS3 standards, respectively. The sampling rate of the universal multiplexer 515 is identical to that of the ADC 505 and greater than either of the STS1 and DS3 clock rates. The maximum sampling rate is determined by hardware limitations and may be expected to increase from a typical value of 100 MHz for today's components to significantly larger values as new hardware is developed.

Data from the ADC output bus 508 and the two serial input lines 510 and 513 are transformed into a high speed serial bit stream by the universal multiplexer 515. The multiplexer output 517 drives a laser transmitter 520 that excites the single-mode fiber 525 coupling the transmitting and receiving communication devices, e.g., the node 501 and hub 502, respectively. At the hub 502, an optical receiver 540 converts the modulated lightwave to an electronic signal that is transferred to the universal demultiplexer 545 via a high-speed serial line 542. The universal demultiplexer 545 reconstructs the transmitted data as described above in reference to FIG. 4. Data is then provided in the STS1 and DS3 formats on serial output lines 555 and 557, respectively, while the multiple-bit output bus 552 is connected to the inputs of a digital-to-analog converter (DAC) 560. The recovered clock pulse 548 is used by the DAC 560 to construct the analog RF output 570 from the data on the universal demultiplexer output bus 552.

A random function can be used to calculate the values, at a particular point in time, corresponding to asynchronous digital input signals in the communication system 500. A first equation (Equation 1, below) describes a function that yields the logical state of a digital input signal.

A second equation (Equation 2, below) describes a function that yields the logical state of the output bit sequence corresponding to the digital input signal.

$$\text{digital value of input signal} = ftn(t^* f_{in}) \quad \text{Equation 1}$$

$$\text{digital value of input signal} = ftn(i^*(f_{in}/f_{clock})) \quad \text{Equation 2}$$

In the above equations, ftn is a function that yields a '1' or a '0' when the product to which the function is applied is an integer, t is a time value measured in seconds, i is a non-negative integer (e.g., 0, 1, 2, ...) representative of the sample time, $f_{in}$ is the frequency of the digital input signal, and $f_{clock}$ is the frequency of the clock signal. Using the functions set forth above, the reconstructed output signals from the hub 502 may be delayed slightly in time and phase, but the logical states of the bit sequences for input and output signals will be equivalent.

When compared to prior art technology, the universal multiplexing/demultiplexing system of the present invention greatly reduces the cost of the multiplexing/demultiplexing operation in a communication system. Furthermore, the loose constraints placed on the input signals make the universal multiplexer/demultiplexer compatible with a wide range of input modulation formats.

Although the preferred embodiments are described with reference to a fiber optical transport system, it should be realized that the invention is not limited to optical communications. In general, it may be used to advantage in any system that is required to transport multiple digital input signals using a broadband serial link.

While specific forms of the invention have been described for purposes of illustration, it is contemplated that numerous changes may be made without departing from the spirit of the invention.

What is claimed is:

1. A transmitter for use in a communication system, the transmitter comprising:
    a clock input for receiving a clock signal having a sampling frequency;
    input ports coupled to external signal sources for receiving input signals that are synchronously modulated at modulation frequencies rationally and fractionally related to the sampling frequency and to each other, wherein the sampling frequency is greater than any of the modulation frequencies;
    an analog-to-digital converter (ADC) for receiving any input signals that in an analog format and converting the analog format to a digital format;
    a multiplexer coupled to the input ports and the ADC for receiving the input signals in a digital format, the multiplexer comprising:
        serializing means for serializing the input signals to generate a single serial output signal; and
        an output port coupled to the serializing means for providing the single serial output signal at a bit rate equivalent to the number of input signals multiplied by the sampling frequency, plus additional overhead for optional framing and error correction; and
    transmission means for transmitting the single serial output as a digital signal.

2. The transmitter of claim 1, wherein, when one of the input signals is an analog input signal, the analog input signal is modulated using bandlimited subcarrier analog modulation prior to reception by the ADC and the multiplexer.

3. The transmitter of claim 2, wherein the modulation frequency of the analog input signal is less than one-half of the sampling frequency.

4. The transmitter of claim 1, wherein, when one of the input signals is a digital input signal, the digital input signal is modulated using a digital baseband format prior to reception by the ADC and the multiplexer.

5. The transmitter of claim 4, wherein the modulation frequency of the digital input signal is related by a rational fraction to the sampling frequency.

6. The transmitter of claim 1, wherein the input signals may be modulated according to different modulation schemes prior to processing by the transmitter.

7. A broadband communication system, comprising:
    a transmitter comprising:
        a clock input for receiving a clock signal having a sampling frequency;
        input ports coupled to external signal sources for receiving input signals that are synchronously modulated at modulation frequencies rationally and fractionally related to the sampling frequency and to each other, wherein the sampling frequency is greater than any of the modulation frequencies;
        an analog-to-digital converter (ADC) for receiving any input signals that in an analog format and converting the analog format to a digital format;
        a multiplexer coupled to the input ports and the ADC for receiving the input signals in a digital format, the multiplexer comprising:
            serializing means for serializing the input signals to generate a single serial output signal; and
            an output port coupled to the serializing means for providing the single serial output signal at a bit rate equivalent to the number of input signals multiplied by the sampling frequency, plus additional overhead for optional framing and error correction; and transmission means for transmitting the single serial output as a digital signal; and a receiver for receiving the digital signal.

8. The broadband communication system of claim 7, wherein, when one of the input signals to the transmitter is an analog input signal, the analog input signal is modulated using bandlimited subcarrier analog modulation prior to reception by the ADC and the multiplexer.

9. The broadband communication system of claim 8, wherein the modulation frequency of the analog input signal is less than one-half of the sampling frequency.

10. The broadband communication system of claim 7, wherein, when one of the input signals is a digital input signal, the digital input signal is modulated using a digital baseband format prior to reception by the ADC and the multiplexer.

11. The broadband communication system of claim 10, wherein the modulation frequency of the digital input signal is related by a rational fraction to the sampling frequency.

12. The broadband communication system of claim 7, wherein the input signals may be modulated according to different modulation schemes prior to processing by the transmitter.

* * * * *

UNITED STATES PATENT AND TRADEMARK OFFICE
CERTIFICATE OF CORRECTION

PATENT NO. : 6,667,994 B1
DATED : December 23, 2003
INVENTOR(S) : Farhan

It is certified that error appears in the above-identified patent and that said Letters Patent is hereby corrected as shown below:

Column 1,
Line 13, delete "Modem" and insert therefore -- Modern --.

Column 5,
Line 40, delete "input" from Equation 2 and insert therefore -- output --.

Signed and Sealed this

Twentieth Day of July, 2004

JON W. DUDAS
*Acting Director of the United States Patent and Trademark Office*